United States Patent [19]

Tsukidate et al.

[11] 4,191,984

[45] Mar. 4, 1980

[54] TAPE CASSETTE

[75] Inventors: Yoshitaka Tsukidate, Tagajyo; Shin Sasaki, Tagahyo, both of Japan

[73] Assignee: Sony Corporation, Tokyo, Japan

[21] Appl. No.: 914,574

[22] Filed: Jun. 9, 1978

[30] Foreign Application Priority Data

Jun. 10, 1977 [JP] Japan .............................. 52-74776[U]

[51] Int. Cl.² .................... G11B 23/06; G11B 15/32; G03B 1/04
[52] U.S. Cl. .................................... 360/132; 242/199
[58] Field of Search ...................... 360/132, 96, 92–93; 242/197–200, 210

[56] References Cited

U.S. PATENT DOCUMENTS

| | | | |
|---|---|---|---|
| 3,675,875 | 7/1972 | Schmidt | 242/199 |
| 3,712,559 | 1/1973 | Schwartz | 242/199 |
| 3,826,489 | 7/1974 | Watkins, Jr. | 360/132 |
| 3,891,159 | 6/1975 | Nelson | 242/199 |
| 3,977,626 | 8/1976 | Gaiser et al. | 242/199 |
| 4,101,096 | 7/1978 | Oishi et al. | 242/199 |
| 4,127,242 | 11/1978 | Hashimoto et al. | 242/199 |

FOREIGN PATENT DOCUMENTS

50-61016 6/1975 Japan .
51-111325 9/1976 Japan .

*Primary Examiner*—John H. Wolff

*Attorney, Agent, or Firm*—Lewis H. Eslinger; Alvin Sinderbrand

[57] ABSTRACT

In a tape cassette with a housing including top and bottom walls having respective pairs of spaced apart openings aligned with each other, a pair of hubs disposed rotatably within the housing between the walls and being accessible through the respective aligned openings for selectively driving the hubs of the cassette, and a magnetic tape wound on a cylindrical circumferential surface of an outer peripheral portion of each of the hubs; each of the hubs includes an annular rib radially inward from the outer peripheral portion and projecting axially beyond opposite flanks of the outer peripheral portion of the hub so as to extend rotatably around annular flanges directed axially inward from the respective aligned openings of the housing walls, and a pair of lubricating sheets are disposed against the inner surfaces of the housing walls and each have a pair of ridges or beads projecting therefrom and a pair of holes located between the ridges and through which the annular flanges on the adjacent wall extend with the annular rib of each hub engaging flat surface portions located between the holes and ridges of the sheets while the ridges of the lubricating sheets are engageable with the flanks of the outer peripheral portions of the hubs for accurately guiding the wound tape in the axial direction of the hubs.

13 Claims, 11 Drawing Figures

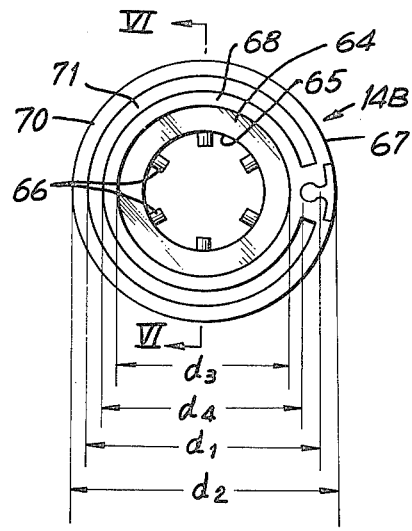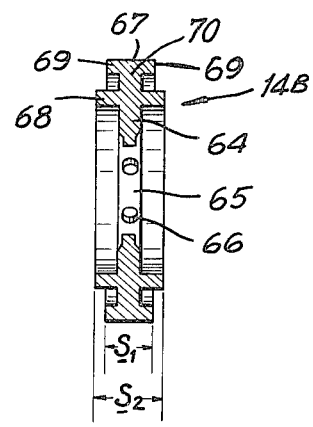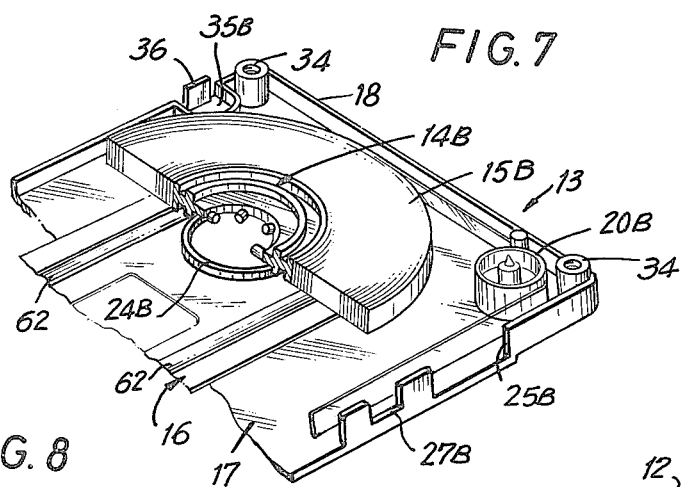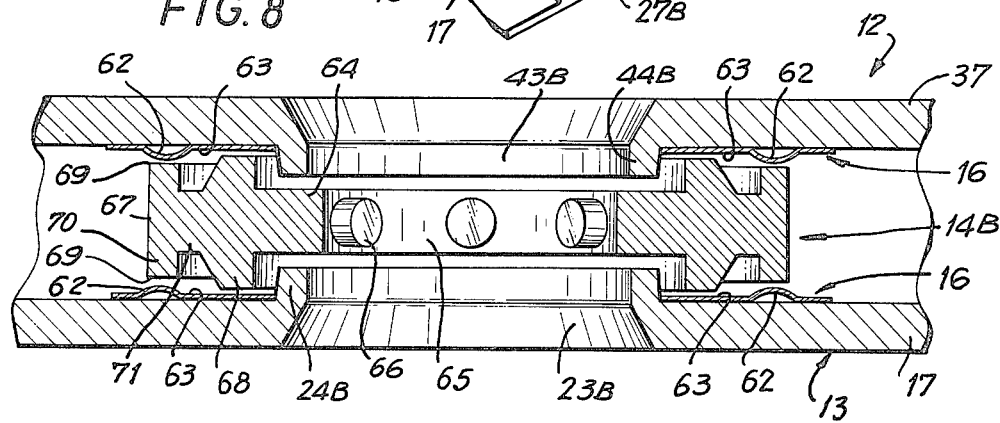

TAPE CASSETTE

BACKGROUND OF THE INVENTION

1. Field of the Invention

This invention relates generally to tape cassettes, and more particularly is directed to improvements in tape cassettes of the type in which a magnetic tape is merely wound on cylindrical circumferential surfaces of hubs rotatable within the housing and which do not have flanges for guiding the tape wound thereon.

2. Description of the Prior Art

In general, when a cassette-type recording and reproducing apparatus is changed-over between its fast-forward operating mode and its record or playback operating mode in which the tape is advanced at a normal forward speed, slack is likely to develop in the tape between the hubs occupying the supply and take-up positions in the cassette disposed at the play position. Such slack results from the fact that the tape is wound more tightly on the hub in the take-up position during advancement of the tape at the normal forward speed, as in the record or playback operating mode than during high speed advancement of the tape, as in the fast-forward operating mode.

In existing tape cassettes of the type in which the tape is simply wound on rotatable hubs within the cassette housing, that is, in which no flanges extend radially from the hubs for guiding the tape as the latter is being wound or unwound, lubricating sheets are usually provided against the inner surfaces of the housing walls for reducing the frictional resistance to turning of the hubs with the tape wound thereon. If the cassette housing is dimensioned so that the lubricating sheets therein closely engage and guide the opposite side edges of the tape as the latter is being wound on the hubs, it is likely that, during a recording or playback operation following a fast-forward operation, the loosely wound turns of the tape on the hub in the take-up position will be seized by the lubricating sheets to resist further winding of the tape on the take-up hub even though the tape is being continuously advanced thereto by the capstan and pinch roller. Accordingly, the tape will become slack or loose between the nip of the capstan with the pinch roller and the take-up hub with the result that a tape loop may be formed and caught again between the capstan and pinch roller so as to be eventually wound around the latter and cause the tape to be severed or seriously damaged.

If the distance between the top and bottom walls of the cassette housing is selected to provide a significant clearance between the tape wound on the hubs and the lubricating sheets disposed against the inner surfaces of the housing walls, then the tape can shift in the axial direction relative to the hubs when being wound on the latter, particularly upon repeated change-over between the fast-forward operating mode and the record or playback operating modes, with the result that the side surfaces of the tape coiled or wound on each hub will be stepped or wavy. Such stepped or wavy side surfaces of the wound tape are again engageable by the lubricating sheets to resist winding of the tape on the hub in response to turning of the latter, particularly at a time following a period of fast-forward operation in which the tape is only loosely wound on the hub.

In order to overcome the foregoing problems, it has been proposed to form the lubricating sheets with numerous raised beads or ridges engageable with the axially facing surfaces of the hubs and also the edges of the tape wound thereon. Although it had been expected that the raised beads or ridges would ensure the accurate or smooth winding of the tape on each hub while avoiding seizing of the wound tape between the lubricating sheets, the results in practice have not lived up to such expectations. More particularly, since axially facing surfaces of the hubs are engaged, under significant pressure, with raised beads or ridges on the lubricating sheets, the precision of the axial location of the hubs thereby is unstable or deteriorates with use due to the resilience or deformation of the raised beads or ridges. Therefore, after more or less extended use of a cassette, the hubs therein are no longer precisely located in the axial direction and uneven winding of the tape can again occur with the previously described undesirable results.

OBJECTS AND SUMMARY OF THE INVENTION

Accordingly, it is an object of this invention to provide a tape cassette which avoids the above described problems associated with the prior art tape cassettes.

More particularly, it is an object of this invention to provide a tape cassette in which the tape is accurately and consistently guided for uniform and troublefree winding on the hubs.

Another object is to provide a tape cassette, as aforesaid, which avoids damage to the tape therein, for example, as when the cassette is employed in an apparatus performing successive fast-forward and record or playback operations.

Still another object is to provide a tape cassette, as aforesaid, in which the hubs are provided with stable axial bearing surfaces within the cassette housing, and the tape is guided reliably and gently in the axial direction of the hub in the take-up position while being wound on the latter so as to avoid interference with the winding of the tape on the take-up hub even following a fast-forward operation.

A further object is to provide a tape cassette, as aforesaid, in which firm axial bearing surfaces for the hubs and gentle, consistent guiding of the tape while being wound on the hubs are provided by lubricating sheets within the cassette housing.

A still further object is to provide a tape cassette, as aforesaid, in which positive location of the lubricating sheets within the cassette housing and the assembling of the tape cassettes are facilitated.

In accordance with an aspect of this invention, in a tape cassette with a housing including top and bottom walls having respective pairs of spaced apart openings aligned with each other, a pair of hubs disposed rotatably within the housing between the walls and being accessible through the respective aligned openings of the housing walls for selectively driving the hubs of the cassette when the latter is in use, and a magnetic tape wound on cylindrical circumferential surfaces of outer peripheral portions of the hubs; each of the hubs includes an annular rib disposed radially inward in respect to the outer peripheral portion thereof and projecting axially beyond opposite flanks of the outer peripheral portion into close proximity to the housing walls and extending rotatably around annular flanges directed axially inward from the respective aligned openings of the housing walls, and a pair of lubricating sheets are disposed against the inner surfaces of the housing walls and each have a pair of ridges or beads projecting therefrom in the direction away from the adjacent wall and a pair of holes located between the ridges and through which the annular flanges on the adjacent wall extend with the spacing between the ridges being selected so that the annular rib of each hub is engageable with, and finds a reliable axial bearing against flat surface portions located between the holes and ridges of the lubricating sheets while the ridges or beads of the lubricating sheets are gently and consistently engageable with the flanks of the outer peripheral portions of the hubs for accurately and reliably guiding the wound tape in the axial direction of the hubs.

The above, and other objects, features and advantages of the invention, will be apparent in the following detailed description of illustrative embodiments of the invention which is to be read in conjunction with the accompanying drawings.

BRIEF DESCRIPTION OF THE DRAWINGS

FIG. 5 is a plan view of one of the hubs included in the tape cassette of FIG. 1;

FIG. 6 is a cross sectional view taken along the line VI—VI on FIG. 5;

FIG. 7 is a fragmentary perspective view which is partly broken away and in section and which illustrates the manner in which a hub of the cassette of FIG. 1 is associated with a section of the cassette housing;

FIG. 8 is an enlarged, detailed sectional view of the cassette of FIG. 1 following the assembling thereof, and which is taken in a diametrical plane of one of the hubs;

DESCRIPTION OF THE PREFERRED EMBODIMENTS

Figure 1:
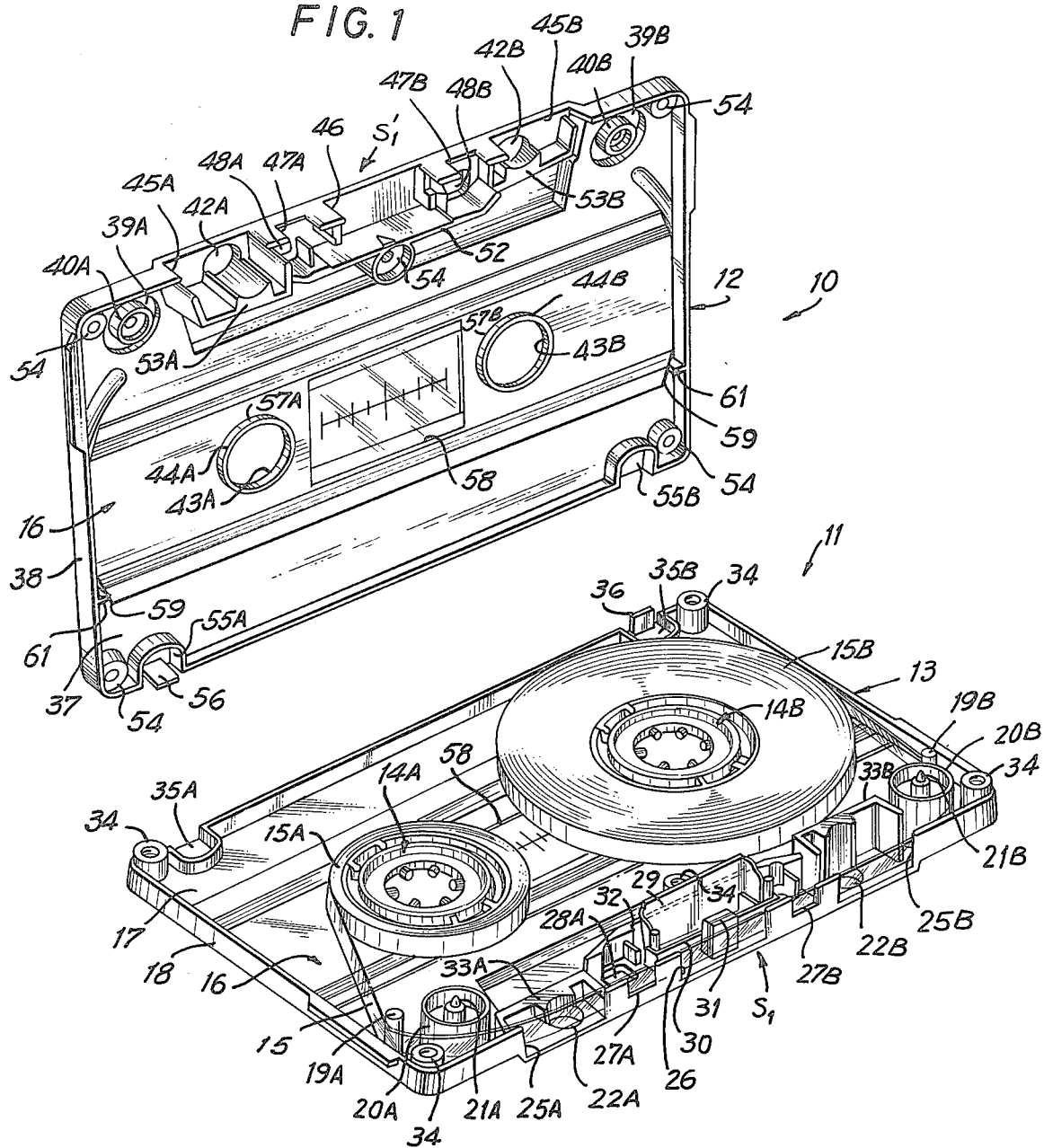
FIG. 1 is an exploded perspective view of a tape cassette embodying this invention.

Referring to the drawings in detail, and initially to FIG. 1 thereof, it will be seen that a tape cassette 10 according to an embodiment of this invention generally comprises a cassette housing or body 11 composed of mating, substantially rectangular upper and lower halves or sections 12 and 13, respectively, a pair of hubs 14A and 14B rotatable within housing 11, a magnetic tape 15 wound on hubs 14A and 14B, as at 15A and 15B, respectively, and lubricating sheets 16 which are interposed between housing sections 12 and 13 and hubs 14A and 14B with the tape 15 wound thereon, as hereinafter described in detail.

The housing sections 12 and 13 are preferably molded of a synthetic resin, such as, polystyrene. The lower section 13 is shown to include a generally rectangular bottom wall 17 with a flange 18 extending along the periphery of wall 17 to cooperate with a similar flange of upper section 12 to define a peripheral wall of cassette housing 11 when sections 12 and 13 are assembled together. In the lower housing section 13, guide pins 19A and 19B and adjacent guide rollers 20A and 20B, respectively, rotatable on pins 21A and 21B are arranged adjacent the corners of housing section 13 which are at opposite ends of one long side $S_1$ of the rectangular housing section. A pair of laterally spaced openings 22A and 22B are symmetrically provided in bottom wall 17 adjacent side $S_1$ for selectively receiving the capstan (not shown) of a tape recording and reproducing apparatus. A pair of laterally spaced, relatively large openings 23A and 23B (FIG. 2) are symmetrically disposed in bottom wall 17 and are located to receive the usual selectively rotated reel drive shafts (not shown) of the recording and reproducing apparatus. Annular flanges 24A and 24B extend around openings 23A and 23B and are directed axially upward from wall 17. The peripheral flange 18 of housing section 13 is formed, along the side $S_1$ thereof, with a pair of symmetrically located, spaced apart cutouts 25A and 25B adjacent openings 22A and 22B, respectively, and with a cutout 26 centered between cutouts 25A and 25B. Relatively small cutouts 27A and 27B are also provided in flange 18 between the central cutout 26 and the cutouts 25A and 25B, respectively, and holes 28A and 28B are provided in bottom wall 17 adjacent cutouts 27A and 27B for receiving locator pins (not shown) of the recording and reproducing apparatus by which cassette 10 is located in a play position.

A magnetic shielding plate 29 (FIG. 1) is spaced inwardly from peripheral flange 18 at the region of the latter having central output 26 therein, and a leaf spring 30 carrying a tape back-up pad 31, for example, of felt, is mounted on shielding plate 29. A reinforcing partition 32 extends in back of shielding plate 20 and, at its opposite end portions, forms tape guide pieces 33A and 33B. Tapped bosses 34 are provided at the four corners of housing section 13 and at the center of partition 32 and are preferably dimensioned to extend above peripheral flange 18. Further, at the long side of rectangular housing section 13 opposite to side $S_1$, peripheral flange 18 is formed with indentations or niches 35A and 35B, and a frangible or removable tab 36 at least initially blocks niche 35B.

The upper housing section 12 is shown to include a generally rectangular top wall 37 which is similar to bottom wall 17, with a flange 38 extending along the periphery of wall 37 to mate with flange 18 of bottom section 13. The underside of top wall 37 has annular recesses 39A and 39B arranged adjacent the corners of section 12 which are at opposite ends of the long side $S'_1$ thereof which is to mate with long side $S_1$ of housing section 13, and sockets 40A and 40B open downwardly within recesses 39A and 39B to receive the upper ends of pins 21A and 21B on which guide rollers 20A and 20B are respectively rotated. A pair of laterally spaced openings 42A and 42B are symmetrically provided in top wall 37 adjacent side $S'_1$ so as to be aligned with openings 22A and 22B in the assembled cassette housing 11. Top wall 37 also has a pair of laterally spaced, relatively large diameter openings 43A and 43B symmetrically located therein for alignment with openings 23A and 23B, respectively, and the openings 43A and 43B are provided with annular flanges 44A and 44B directed axially downward from top wall 37. The peripheral flange 38 of upper housing section 12 is shown to have cutouts 45A, 45B, 46, 47A and 47B spaced apart along side $S'_1$ and being dimensioned and positioned to mate with cutouts 25A, 25B, 26, 27A and 27B, respectively, of the lower housing section. Top wall 37 of upper housing section 12 is further shown to have openings 48A and 48B therein adjacent cutouts 47A and 47B for alignment with openings 28A and 28B, respectively, of the lower housing section. A partition 52 spaced inwardly from side S'₁ of upper housing section 12 and tape guides 53A and 53B defined by the opposite end portions of partition 52 are dimensioned and positioned to mate with partition 32 and tape guides 33A and 33B of the lower housing section. The upper housing section further has hollow bosses 54 at its corners and at the corner of partition 52 for alignment with the similarly positioned bosses 34 of the lower housing section. Finally, upper housing section 12 is shown to have indentations or niches 55A and 55B in peripheral flange 38 adjacent the opposite ends of the long side opposite side S'₁ to mate with niches 35A and 35B, and a frangible or removable tab 56 which, at least initially, blocks the niche 55A.

After hubs 14A and 14B with the tape 15 wound thereon have been installed in lower housing section 13 with a lubricating sheet 16 between the hubs and bottom wall 17, upper housing section 12 is mated with lower section 13 with another lubricating sheet 16 between top wall 37 and hubs 14A and 14B. Then, the two housing sections or halves 12 and 13 are secured to each other by screws (not shown) which are extended through the holes in bosses 54 of section 12 and threaded into the tapped bosses 34 of section 13. It will be apparent that, when tape cassette 10 is thus assembled, tape 15 between hubs 14A and 14B is guided by pins 19A and 19B, rollers 20A and 20B and guide pieces 33A, 33B and 53A, 53B so as to follow a path including a straight run along the relatively long side of the rectangular housing 11 corresponding to sides S₁ and S'₁ of the housing sections. In the assembled housing 11, cutouts 26 and 46 are aligned to define an opening or window at which the straight run of the tape is exposed and backed up by pad 31 for engagement by a magnetic recording and reproducing head (not shown) of a recording and reproducing apparatus. Furthermore, cutouts 25A and 25B are aligned with cutouts 45A and 45B to define respective openings or windows at which the tape can be engaged by a pinch roller (not shown) of the recording and reproducing apparatus when the cassette housing 11 is disposed at the play position so as to receive the capstan either in openings 22A and 42A or in openings 22A and 42B, respectively. Moreover, in the assembled cassette housing 11, tabs 36 and 56 at least initially block the niches 35B, 55B and 35A, 55A, respectively, so that, when tape cassette 10 is employed in a suitably equipped recording and reproducing apparatus, the presence of tabs 36 and 56 indicates that recording operations may be performed with the cassette in either of its positions. On the other hand, the removal of the tab 36 or 56 is effective to prevent accidental erasure of previously recorded information in a respective track on the tape by barring a recording operation with the cassette housing 11 in the respective position.

Figure 2:
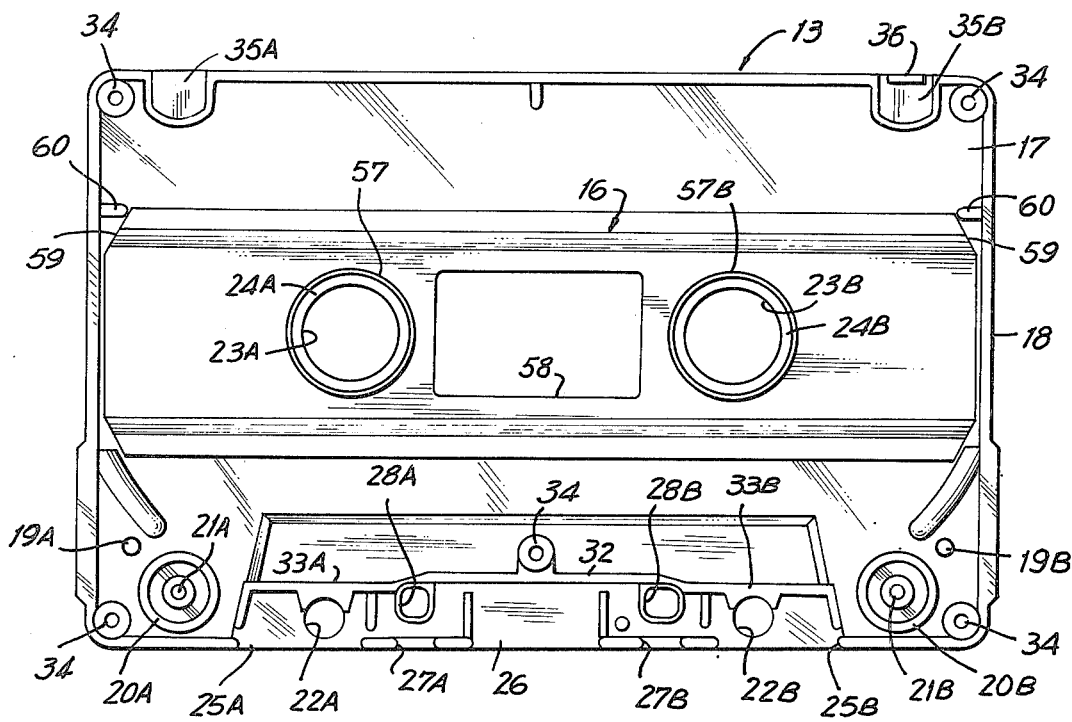
FIG. 2 is a plan view of one section of the cassette housing included in the tape cassette of FIG. 1 and of a lubricating sheet provided therein in accordance with this invention.
Figure 3:
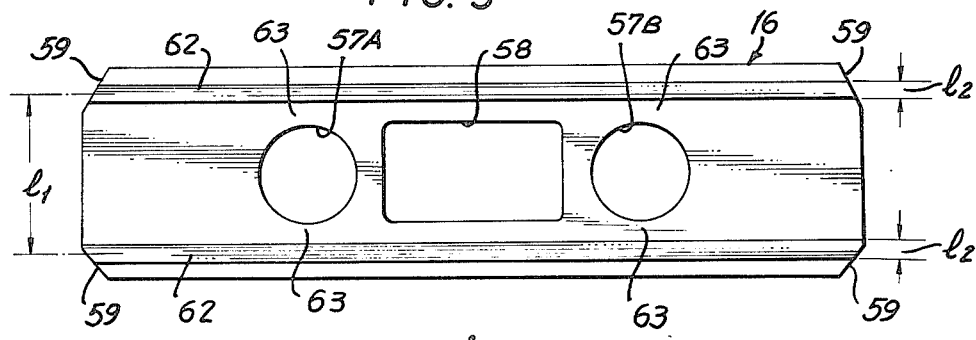
FIG. 3 is a plan view of the lubricating sheet shown on FIG. 2.

As shown particularly in FIGS. 2 and 3, each of the lubricating sheets 16 is generally of rectangular shape and has a pair of laterally spaced apart circular holes 57A and 57B dimensioned and located to permit the annular flanges 24A and 24B or 44A and 44B to extend therethrough. Each lubricating sheet 16 may further have a rectangular opening 58 disposed between circular openings 57A and 57B so as to register with a window or transparent portion provided in bottom wall 17 or top wall 37 for permitting observation of the amounts of tape wound on hubs 14A and 14B. Each of the lubricating sheets 16 is shown to be provided with beveled corners, as at 59, for contacting position-defining projections 60 (FIG. 2) and 61 (FIG. 1) extending from the peripheral flanges 18 and 38 of the lower and upper housing sections.

Figure 4:
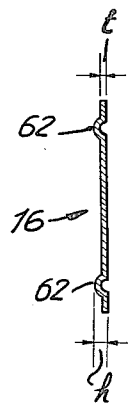
FIG. 4 is a cross sectional view of the lubricating sheet of FIG. 3.

Each of the lubricating sheets 16 may be made of a super-high-density polyethylene resin or any other lubricating material affording sufficient rigidity and resiliency to the sheet. In accordance with this invention, each lubricating sheet 16 is formed with two raised beads or ridges 62 projecting therefrom in the direction away from the adjacent wall 17 or 37, with the beads or ridges 62 on each sheet 16 being spaced apart and having the holes 57A and 57B located therebetween. The distance between the beads or ridges 62, at least at the region of each of the holes 57A and 57B is greater than the diameter of such holes so that relatively flat or planar surface portions 63 of the lubricating sheet are present between the edges of the holes 57A and 57B and the beads or ridges 62 extending therepast. As shown, the beads or ridges 62 are preferably rectilinear and extend parallel to a line passing through the centers of the holes 57A and 57B. In a particular example of the invention, the thickness t (FIG. 4) of each lubricating sheet 16 is 50 microns, the height h of each raised bead or ridge 62 is between 0.28 and 0.53 millimeters, the distance $l_1$ (FIG. 3) between the center lines of the raised beads 62 is 20.8 millimeters and each of the raised beads 62 has a width $l_2$ of 2.0 millimeters.

As shown particularly on FIGS. 5-8 in respect to the hub 14B, each of the hubs 14A and 14B includes an annular disc 64 which defines a central opening or socket 65 in which a plurality of radial lugs 66 extend for rotatably coupling the respective hub 14A or 14B to a reel drive shaft (not shown) of a recording and reproducing apparatus. In accordance with this invention, the disc 64 of each of the hubs 14A and 14B has an outer peripheral portion with a cylindrical circumferential surface 67 on which the tape 15 is wound, and an annular rib 68 spaced radially inward from the circumferential surface 67 and having an axial dimension $s_2$ (FIG. 6) greater than the axial width $s_1$ of the circumferential surface 67. Thus, the annular rib 68 projects axially beyond the opposite flanks 69 of the outer peripheral portion of the hub.

In the illustrated embodiment of the invention, the outer peripheral portion of each of the hubs 14A and 14B is shown to be constituted by an outer annular rib 70 having the axial dimension $s_1$ smaller than the axial dimension $s_2$ of the first mentioned or inner annular rib 68 and being separated from the latter by an annular portion of the hub which is relatively thin in the axial direction, as indicated at 71 on FIG. 8. The inner annular rib 68 of each hub is diametrically dimensioned so that the same can extend loosely about the annular flanges 24A and 44A or 24B and 44B of the cassette housing, as particularly shown on FIG. 8, with the result that such annular flanges effect approximate rotatable positioning of the hubs within cassette housing 11. Further, the annular ribs 68 and 70 of each of the hubs 14A and 14B are diametrically dimensioned so that the axially facing surfaces of the inner rib 68 will confront the flat or planar surface portions 63 of the lubricating sheets 16 between the beads or ridges 62 and the opening 57a or 57b of the lubricating sheet, while the flanks 69 or axially facing surfaces of the outer peripheral portion or rib 70 will confront the beads or ridges 62 of the lubricating sheets at diametrically opposed locations on the outer rib 70.

In a practical example of the embodiment of the invention being herein described, and in which the lubricating sheets 16 have the previously indicated dimensions, the inner and outer diameters $d_1$ and $d_2$, respectively, of the outer rib 70 (FIG. 5) are 20 and 22 millimeters, respectively, while the inner and outer diameters $d_3$ and $d_4$ of the inner rib 68 are 14.8 and 16.9 millimeters, respectively. Furthermore, in such example, the axial width $s_1$ of the outer peripheral rib 70 is 4.0 millimeters, which is preferably equal to the width of the tape 15 to be wound on circumferential surface 67, and the axial width $s_2$ of the inner rib 68 is 4.6 millimeters, from which it follows that each axially facing surface of inner rib 68 projects 0.3 millimeters axially beyond the adjacent flank 69 of the outer peripheral portion or rib 70. Thus, with each of the beads or ridges 62 of each lubricating sheet 16 having a dimension h (FIG. 4) ranging from 0.28 to 0.53 millimeters, as previously mentioned, then the beads or ridges 62 will range from having approximate contact with flanks 69 of outer rib 70 to exerting a light, resiliently flexible pressure thereagainst, assuming in all cases that the inner rib 68 is in axial bearing contact with a flat or planar surface portion 63 of the lubricating sheet.

When tape cassette 10 having the above described arrangement of its hubs 14A and 14B and lubricating sheets 16 in accordance with this invention is mounted in a play position in a tape recording and reproducing apparatus, operation of such apparatus in its various modes will not give rise to any permanent deformation or deterioration of the raised beads or ridges 62 of the lubricating sheets 16. More particularly, it will be seen that the inner rib 68 of each hub is axially dimensioned so that its engagement with a flat or planar surface portion 63 of the lubricating sheets 16 substantially eliminates axial play of the respective hub within cassette housing 11. Thus, when the cassette 10 is placed in a horizontal play position, the build-up of the weight of tape 15 on one or the other of hubs 14A and 14B during a fast-forward, rewind, record or playback operation cannot cause axial displacement of the hub within the cassette housing. In other words, flat surface portions 63 of lubricating sheets 16 serve as axial bearings for hubs 14A and 14B thereby suppressing those variations in the axial positions of the hubs which might cause the latter to deform or damage the raised beads or ridges 62. Further, the opposite flanks 69 of the outer peripheral portion or rib 70 of each hub are either approximately contacted or, at most, lightly pressed by the raised beads or ridges 62 of the lubricating sheets so that such beads or ridges are similarly only in approximate or light contact with the side edges of the tape being wound on circumferential surface 67 of the hub and having substantially the same width. From the foregoing, it will be seen that beads or ridges 62 of the lubricating sheets ensure that the tape will be wound smoothly on each hub, that is, with the side or radial surfaces of the wound tape being maintained smooth or flat, while avoiding any significant resistance to the winding of the tape on the hub, such as might arrest the winding action if the tape has been previously only loosely wound on the hub, as during a fast-foward operation. Deformation of the raised beads or ridges 62 by the wound tape is avoided when the axial width $s_1$ of the circumferential surface 67 of the hub on which the tape 15 is wound is substantially equal to the width of the tape, as previously indicated.

Figure 11:
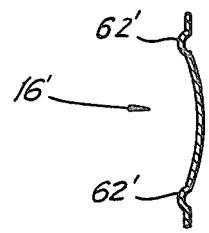
FIG. 11 is a cross sectional view of the lubricating sheet shown on FIG. 10.

Referring now to FIG. 11, it will be seen that the smooth supporting of the side surfaces of the magnetic tape wound on each of the hubs in a tape cassette according to the present invention may be further enhanced by forming each of the lubricating sheets 16' so as to be curved in the direction transverse to the parallel beads or ridges 62', with such curvature of each lubricating sheet 16' being concave at the side of the sheet from which the beads or ridges 62' are made to project.

When the above described lubricating sheets 16' are molded in a tape cassette 10' according to this invention, as shown on FIG. 9 in which the various parts of the tape cassette 10' corresponding to those previously described with reference to FIGS. 1-8 are identified by the same reference numerals, the convex surfaces of lubricating sheets 16' confront the top and bottom walls 37 and 17, respectively, of sections 12' and 13' of the cassette housing. Therefore, in the assembled tape cassette 10', the longitudinal edge portions of lubricating sheets 16' in which the beads or ridges 62' are formed tend to stand away from the adjacent walls 17 and 37 so as to ensure the engagement, with a light resilient pressure, of beads or ridges 62' with the opposite side surfaces of the tape being wound on hubs 14A and 14B, as at 15A and 15B. Although the transverse curvature of lubricating sheets 16' enhances the performance of the latter in ensuring the smooth winding of the tape on hubs 14A and 14B, the curvature of the lubricating sheets can give rise to problems in assembling tape cassette 10', particularly in respect to maintaining engagement of annular flanges 24A, 24B and 44A, 44B in holes 57A and 57B of the adjacent lubricating sheets during the mating of upper housing section 12' with lower housing section 13'. In order to avoid the foregoing problem, each of the rectangular lubricating sheets 16' is formed with cutouts 72A and 72B in end portions of its opposite, relatively short sides which are adjacent one of the relatively long sides 73 of the rectangular sheet. Thus, tab-like formations 74A and 74B are defined between cutouts 72A and 72B, respectively, and the adjacent side 73 (FIG. 10).

Figure 9:
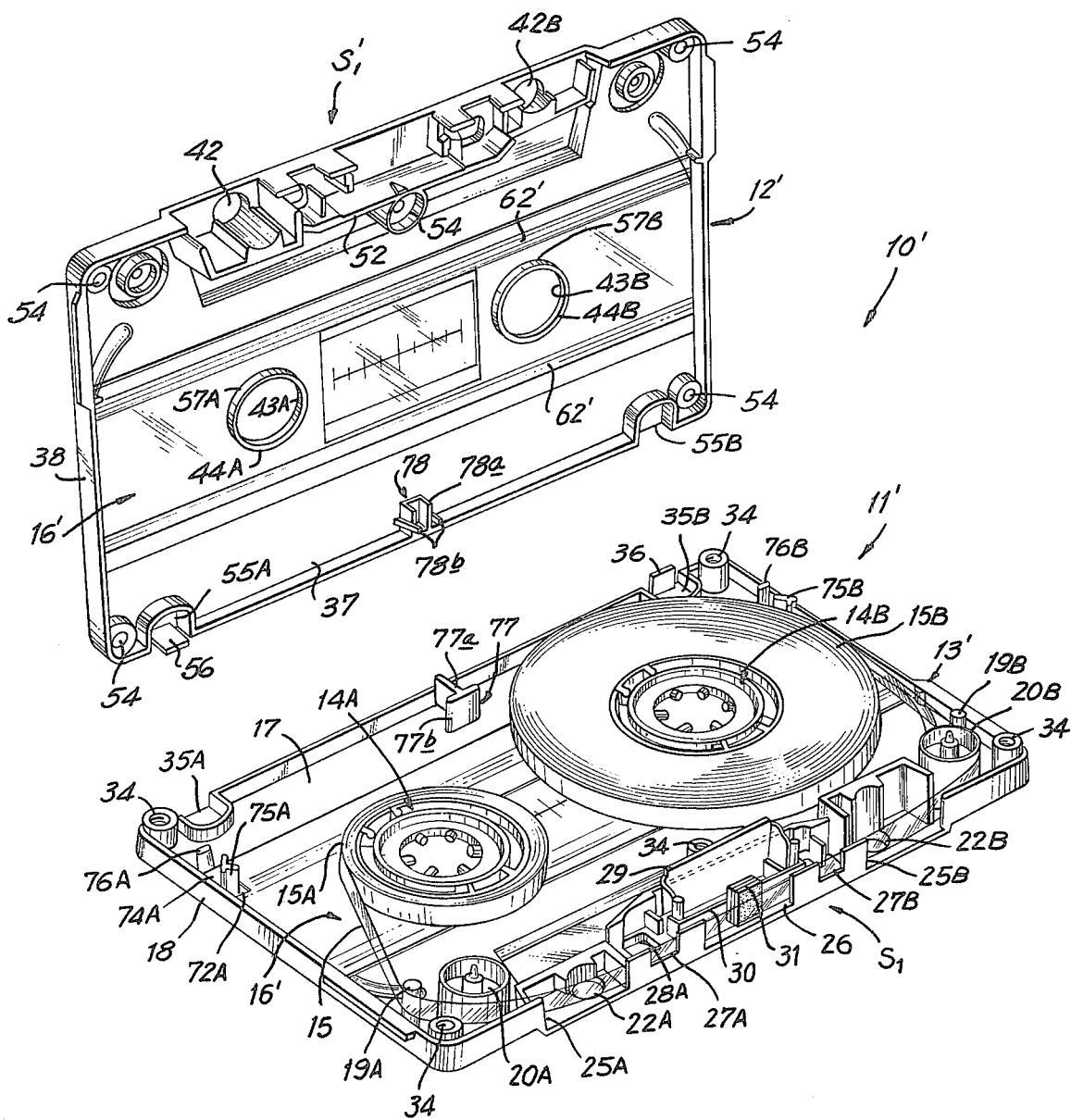
FIG. 9 is an exploded perspective view similar to that of FIG. 1, but showing another embodiment of the present invention.
Figure 10:
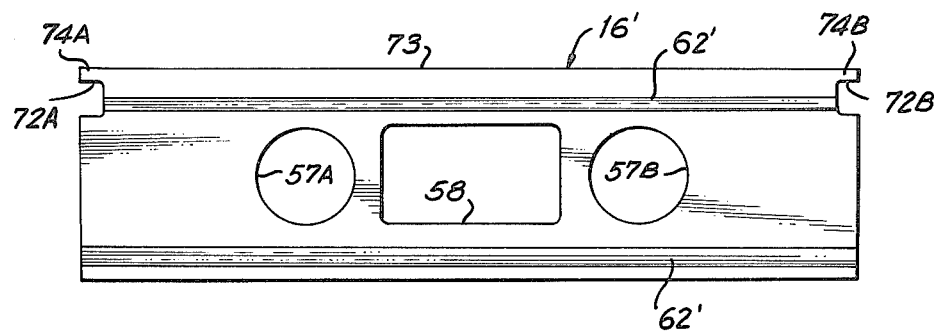
FIG. 10 is a plan view of one of the lubricating sheets included in the tape cassette of FIG. 9.

For association with the above-described lubricating sheets 16', the lower housing section 13' has locator projections 75A and 76A and locator projections 75B and 76B extending upwardly from bottom wall 17 adjacent the opposite relatively short sides of housing section 13' (FIG. 9). As shown, locator projections 75A, 75B, 76A and 76B are all substantially taller than peripheral flange 18 of lower housing section 13' so as to extend into upper housing section 12' in the assembled condition of housing 11'. Further, projections 75A and 76A and projections 75B and 76B are spaced from each other and located so that when projections 75A and 75B are engaged in cutouts 72A and 72B, respectively, of lubricating sheets 16', the tab-like formations 74A and 74B of the latter engage snuggly between locator projections 75A and 76A and between locator projections 75B and 76B, respectively. By reason of the extension of locator projections 75A, 76A, 75B, 76B above peripheral flange 18, when assembling tape cassette 10', hubs 14A and 14B with tape 15 wound thereon can be suitably placed in lower housing section 13' on top of a first lubricating sheet 16' which is upwardly concave and engaged with the locator projections, as previously described and shown on FIG. 9, and then a second lubricating sheet 16' with its concave side facing downwardly can be placed over the hubs having the tape wound thereon so as to also engage the locator projections 75A, 76A, 75B and 76B and be positioned thereby while the upper housing section 12' is mated with lower housing section 13' and secured to the latter by screws (not shown) engaging in bosses 34 and 54.

In order to facilitate alignment of the bosses 54 with the bosses 34 and the engagement of annular flanges 44A and 44B in holes 57A and 57B of the upper lubricating sheet 16' when assembling together housing sections 12' and 13', interengageable positioning members 77 and 78 are provided just inside peripheral flanges 18 and 38 of housing sections 13' and 12', respectively, at the centers of the sides thereof opposed to the long sides $S_1$ and $S'_1$. As shown, the positioning member 77 is generally T-shaped and includes a stem 77a extending inwardly from peripheral flange 18 and a head 77b directed across the stem, with both stem 77a and head 77b projecting substantially above the upper edge of peripheral flange 18. The other positioning member 78 includes a channel-like portion 78a with a depth approximately equal to that of peripheral flange 38 and having pins 78b projecting from the opposite sides of the channel-like portion 78a. When assembling the housing sections 12' and 13' the upper housing section 12' is initially engaged with lower housing section 13' in the orientation shown on FIG. 9, and is then tilted or pivoted forwardly so that the upwardly projecting edge portion of stem 77a enters channel-like portion 78a to establish the relative positions of the housing sections in the direction of the major axis of the rectangular housing. Simultaneously, the pins 78b engage at opposite sides of stem 77a against the face of head 77b facing toward the adjacent peripheral flange 18 so as to establish the relative positions of housing sections 12' and 13' in the direction of the minor axis thereof. Accordingly, the housing sections 12' and 13' are accurately aligned with each other to facilitate the assembling thereof.

It will be clear from the above description of tape cassettes 10 and 10' that, in accordance with the present invention, the axial bearing surfaces for the hubs 14A and 14B are provided by relatively flat portions of the lubricating sheets 16 or 16', while the guiding of the magnetic tape 15 in the axial direction of the hubs is effected by the raised beads or ridges 62 or 62' on the lubricating sheets. As a result of the foregoing characteristic features of tape cassettes according to this invention, the side surfaces of the tape wound on the hubs are relatively smooth, that is, stepped formations or deformed windings of the tape on the hubs due to changes in the speed at which the magnetic tape is driven are positively avoided for ensuring the stable rotation of the hubs and the avoidance of damage to the magnetic tape.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape cassette comprising:
   a housing including a pair of opposed, spaced apart walls, each of said walls having a pair of spaced apart openings therein which are aligned with corresponding openings in the other of said walls and annular flanges extending around said openings and being directed axially therefrom at the side of the respective wall facing toward said other wall;
   a pair of hubs disposed within said housing between said walls, each of said hubs including an outer peripheral portion having a cylindrical circumferential surface and an annular rib spaced radially inward from said circumferential surface and having an axial dimension greater than the axial width of said circumferential surface so as to project axially beyond opposite flanks of said outer peripheral portion into close proximity to said walls, said rib of each of said hubs extending rotatably around said annular flanges associated with respective ones of said aligned openings in said walls of the housing;
   a magnetic tape in said housing wound on the cylindrical circumferential surfaces of said hubs; and
   a pair of lubricating sheets disposed against the sides of said walls which face toward each other, each of said lubricating sheets having a pair of holes therein aligned with said openings in the adjacent one of said walls and with said annular flanges of said adjacent wall extending through said holes of the lubricating sheet, and each of said lubricating sheets further having a pair of ridges projecting therefrom in the direction away from said adjacent wall, said ridges on each sheet being spaced apart with said holes located between said ridges and with the distance between said ridges, at least at the region of each of said holes, being larger than the outer diameter of said rib of each hub and no greater than the diameter of said circumferential surface of the hub, each of said sheets having flat surface portions between said holes and said ridges engageable by said ribs of the hubs for providing axial bearings for the latter, and said ridges of the lubricating sheets extending at least substantially to said flanks of the outer peripheral portion of each of said hubs for accurately guiding said tape therebetween when being wound on said hubs.

2. A tape cassette according to claim 1; in which the distances that said ridges project beyond said flat surface portions are substantially equal to the distance that said rib of each hub projects axially beyond said flanks of the outer periheral portion.

3. A tape cassette according to claim 1; in which the axial dimension of said cylindrical circumferential surface is equal to the width of said tape wound thereon.

4. A tape cassette according to claim 1; in which each of said hubs has an annular portion interposed radially between said flanks and said rib and which is relatively thin in the axial direction so that said outer peripheral portion is in the form of an outer rib of smaller axial extent than the first mentioned rib.

5. A tape cassette according to claim 4; in which the distance between said ridges, at least at said region of each of the holes, is substantially equal to the diameter of said outer rib.

6. A tape cassette according to claim 1; in which each of said ridges is constituted by a bead formed in the respective lubricating sheet.

7. A tape cassette according to claim 6; in which each of said ridges is rectilinear, and said ridges of each sheet extend parallel to a line through the centers of said holes in the respective sheet.

8. A tape cassette according to claim 1; in which each of said sheets is generally rectangular and has bevelled corners, and said housing has locator projections therein against which said bevelled corners abut for locating each of said sheets within the housing.

9. A tape cassette according to claim 1; in which each of said lubricating sheets is of generally rectangular configuration and elongated in the direction of a line extending through the centers of said holes in the respective sheet, said ridges are rectilinear and extend parallel to said line through the centers of said holes, and each said sheet is arcuate in the direction transverse to said line so as to be concave at the side thereof facing toward said hubs.

10. A tape cassette according to claim 1; in which said housing includes first and second separately formed sections respectively having said opposed walls and peripheral flanges which mate to define a peripheral wall of the housing, said opposed walls are substantially rectangular with the major axes thereof coinciding with lines through the centers of the respective spaced apart openings, and cooperatively engageable positioning members are provided in said first and second housing sections at one of the long sides of said rectangular walls for aligning said first and second housing sections with each other when one section is pivoted toward the other about said one long side.

11. A tape cassette according to claim 10; in which each of said lubricating sheets is of generally rectangular configuration and elongated in the direction of said lines through the centers of said spaced apart openings, said ridges are rectilinear and extend parallel to said lines, and each of said sheets is arcuate in the direction transverse to said lines so as to be concave at the side thereof facing toward said hubs.

12. A tape cassette according to claim 11; in which one of said housing sections has locator projections extending from the respective one of said opposed walls substantially beyond the level of the respective peripheral flange, and each of said lubricating sheets has cutouts engageable with said locator projections so that both sheets can be positioned thereby in respect to said one housing section to which the other housing section is thereafter assembled.

13. A tape cassette according to claim 12; in which said cooperatively engageable positioning members include a T-shaped member having a stem extending from said peripheral flange of said one housing section and a head crossing the stem with at least said stem projecting above the adjacent peripheral flange, and a channel-like member in the other of said housing sections to receive said stem projecting above the adjacent peripheral flange, and pins extending from said channel-like member to engage against said head of the T-shaped member at the opposite sides of said stem.

* * * * *